United States Patent [19]
Ishizaka

[11] Patent Number: 5,953,149
[45] Date of Patent: Sep. 14, 1999

[54] SEMICONDUCTOR ELECTROABSORPTION OPTICAL MODULATOR

[75] Inventor: Masashige Ishizaka, Tokyo, Japan

[73] Assignee: NEC Corporation, Tokyo, Japan

[21] Appl. No.: 08/877,371

[22] Filed: Jun. 17, 1997

[30] Foreign Application Priority Data

Jun. 17, 1996 [JP] Japan ................................. 8-155745

[51] Int. Cl.$^6$ ............................ G02F 1/025; G02F 1/015
[52] U.S. Cl. ........................................ 359/248; 359/181
[58] Field of Search .................................. 359/245, 247, 359/248, 181

[56] References Cited

U.S. PATENT DOCUMENTS

| 5,521,738 | 5/1996 | Froberg et al. ........................... 359/184 |
| 5,732,097 | 3/1998 | Yamaguchi et al. ....................... 372/38 |

FOREIGN PATENT DOCUMENTS

| 7-106691 | 4/1995 | Japan . |
| 8-248364 | 9/1996 | Japan . |
| 9-54290 | 2/1997 | Japan . |
| 9179079 | 7/1997 | Japan . |
| 9-311304 | 12/1997 | Japan . |

OTHER PUBLICATIONS

1995 IEICE General Meeting, pp. 349, C–349. "Low–chirp, low–polarization dependent characteristics of electroabsorption optical intensity modulator with an InGaAsP bulk", published in 1995.

1995 IEICE Electronis Society, pp. 301, C–301. "10 Gb/s Transmission over 100 km of Standard Fiber with a Blue Chirp Modulator Integrated Laser", Mar. 1996.

K. Yamada et al., "Low–chirp, low–polarization dependent characteristics of electroabsorption optical intensity modulator with an inGaAsP bulk", *1995 IEICE General Meeting*, C–349, pp. 349.

K. Morito et al., "10 Gb/s Transmission over 100 km of Standard Fiber with a Blue Chirp Modulator Integrated DFB Laser", *1995 IEICE Electronics Society*, C–301, pp. 301 Mar. 1996.

H. Ooi et al., "10 Gb/s SMF transmission characteristics using modulator integrated DFB laser", *1996 IEICE General Meeting*, B–1103, pp. 535.

F. Devaux et al., "Simple Measurement of Fiber Dispersion and of Chirp Parameter of Intensity Modulated Light Emitter", *Journal of Lighwave Technology*, vol. 11, No. 12, Dec. 1993, pp. 1937–1940.

J.A.J. Fells et al., "Transmission beyond the dispersion limit using a negative chirp electroabsorption modulator", *Electronics Letters*, vol. 30, No. 14, Jul. 7, 1994, pp. 1168–1169.

*Primary Examiner*—Georgia Epps
*Assistant Examiner*—Margaret Burke
*Attorney, Agent, or Firm*—Sughrue, Mion, Zinn, Macpeak & Seas, PLLC

[57] ABSTRACT

A semiconductor optical modulator is provided, which is capable of stable modulation operation against the detune fluctuation. This modulator includes a semiconductor optical absorption layer formed on or over a semiconductor substrate, and a pair of electrodes arranged at each side of the absorption layer for applying an electric field to the absorption layer. A detune is determined in such a way that a changing rate in refractive-index of the absorption layer generated on application of a fixed biasing electric-field to the absorption layer increases from its initial value at the time no biasing electric-field is applied. When a signal electric-field is additionally applied to the absorption layer by introducing an incident light into the absorption layer while applying the biasing electric-field, (a) the changing rate in refractive-index of the absorption layer is decreased or substantially unchanged due to the applied signal electric-field with respect to a value under application of the biasing electric-field, and at the same time, (b) the absorption coefficient of the absorption layer is increased from its initial value at the time the signal electric-field is not applied and the biasing electric-field is applied.

5 Claims, 8 Drawing Sheets

SEMICONDUCTOR ELECTROABSORPTION OPTICAL MODULATOR

BACKGROUND OF THE INVENTION

1. Field of the Invention

The present invention relates to a semiconductor optical modulator that plays an important role in optical communication systems and optical information systems and more particularly, to an electroabsorption-type semiconductor optical modulator with a low chirping characteristic, which is preferably used for long-distance transmission of information.

2. Description of the Prior Art

In recent years, with the increasing transmission speed and length or distance of optical communication systems, a problem in the conventional direct modulation method of a semiconductor laser has been becoming conspicuous.

Specifically, in the direct modulation method, the "wavelength chirping" phenomenon that the wavelength of an output light beam from the laser fluctuates or deviates dependent upon time tends to occur on modulation of the beam. Thus, the wavelength of the modulated light beam tends to deviate from a specific oscillation wavelength.

When the modulated light beam is transmitted through an optical fiber, the waveform of the transmitted beam will be distorted or degraded due to the existence of the dispersion of the fiber. This distortion or degradation of the transmitted beam will be conspicuous more and more as the transmission distance increases.

Especially, this problem is serious for optical information systems using the conventional 1.3-$\mu$m optical fibers with no dispersion. Even if the optical fibers of this sort and a semiconductor laser with a 1.55-$\mu$m oscillation wavelength and a low propagation loss are used, the transmissible distance cannot be increased due to the above chirping phenomenon.

This problem can be solved by using the conventional external modulation method, where an external optical modulator is provided separately from a semiconductor laser, and a constant optical output from the semiconductor laser is modulated by the external modulator. Therefore, in recent years, a lot of the external modulators of this sort have been vigorously developed.

Within the external modulators of this sort, there are two types, one of which uses a dielectric material such as $LiNbO_3$ and another of which uses a semiconductor material such as InP or GaAs.

Recently, the semiconductor optical modulator using the semiconductor material has been expected to be improved. This is because the modulator of this type is capable of not only integration with other optical components/elements such as optical amplifiers and electronic circuits/devices such as Field-Effect Transistors (FETS) but also miniaturization and operating-voltage reduction.

There are two types, the "electroabsorption" type and the "Mach-Zehnder" type, in the semiconductor optical modulators of this sort.

In the optical modulators of the "electroabsorption" type, a phenomenon that the optical absorption edge of a semiconductor material is shifted toward a long-wavelength side upon application of an electric field is utilized. There are the Franz-Keldysh effect for a bulk semiconductor material and the quantum-confined Stark effect for a multiple quantum-well (MQW) as the phenomenon of this sort.

In the optical modulators of the "Mach-Zehnder" type, a phenomenon that the refractive index of a semiconductor material is changed upon application of an electric field is utilized. There are known the electrooptic effect such as the Pockels effect for a bulk semiconductor material and the quantum-confined Stark effect for a Multiple Quantum-Well (MQW) as the phenomenon of this sort.

With the semiconductor optical modulators of the Mach-Zehnder type, the chirping phenomenon can be completely prevented from occurring based on their operating principle. However, the modulators have an interference-type waveguide structure (not a simple linear waveguide). Therefore, the modulators have a problem that not only the fabrication processes but also the driving or operating method are complicated.

On the other hand, with the semiconductor optical modulators of the electroabsorption type, although the chirping phenomenon is much lower than that in the direct modulation method of the semiconductor laser, the chirping phenomenon cannot be completely prevented.

Generally, when an electric-field corresponding to an electric signal is applied to a semiconductor optical absorption layer of a semiconductor optical modulator of the electroabsorption type, the absorption coefficient of the layer increases and at the same time, the refractive index of the absorption layer changes toward a positive side (i.e., increases). Consequently, the positive chirping occurs, resulting in degradation in dispersion resistance and limit in transmission distance.

Recently, however, it was confirmed by experiments that the chirping phenomenon could be suppressed if an electric-field corresponding to an electric signal is additionally applied to a semiconductor optical modulator of the electroabsorption type while a fixed bias electric-field is applied to the same modulator. This is termed the "prebias" method. This method is prospective because it will enable the ultra-high-speed and long-distance optical communication using the semiconductor optical modulators of this type.

An example of the conventional semiconductor optical modulators of the electroabsorption type is disclosed by K. Yamada et al., in the paper, 1995 IEICE General Meeting, pp. 349, C-349, published in 1995. This modulator has a bulk InGaAsP absorption layer with an absorption-edge wavelength or bandgap wavelength of 1.5 $\mu$m. Incident light has a wavelength of 1.55 $\mu$m. When an electric-field corresponding to an electric signal is additionally applied to the modulator while a fixed bias electric-field is applied to the same modulator, the dispersion resistance can be improved at a transmission speed of 10 Gb/s. This means that the limit in transmission distance can be overcome even at this transmission speed.

Another example of the conventional semiconductor optical modulators of the electroabsorption type is disclosed by K. Morito et al., in the paper, 1995 IEICE Electronics Society, pp. 301, C-301, published in 1995. This modulator is integrated with a Distributed FeedBack (DFB) semiconductor laser. This paper describes that when an electric-field corresponding to an electric signal is additionally applied to the modulator while a fixed bias voltage of 1.1 V is applied to the same modulator, the dispersion resistance can be improved. Thus, the optical transmission is successful at a transmission speed of 10 Gb/s over a transmission distance of 100 km.

Figure 1:
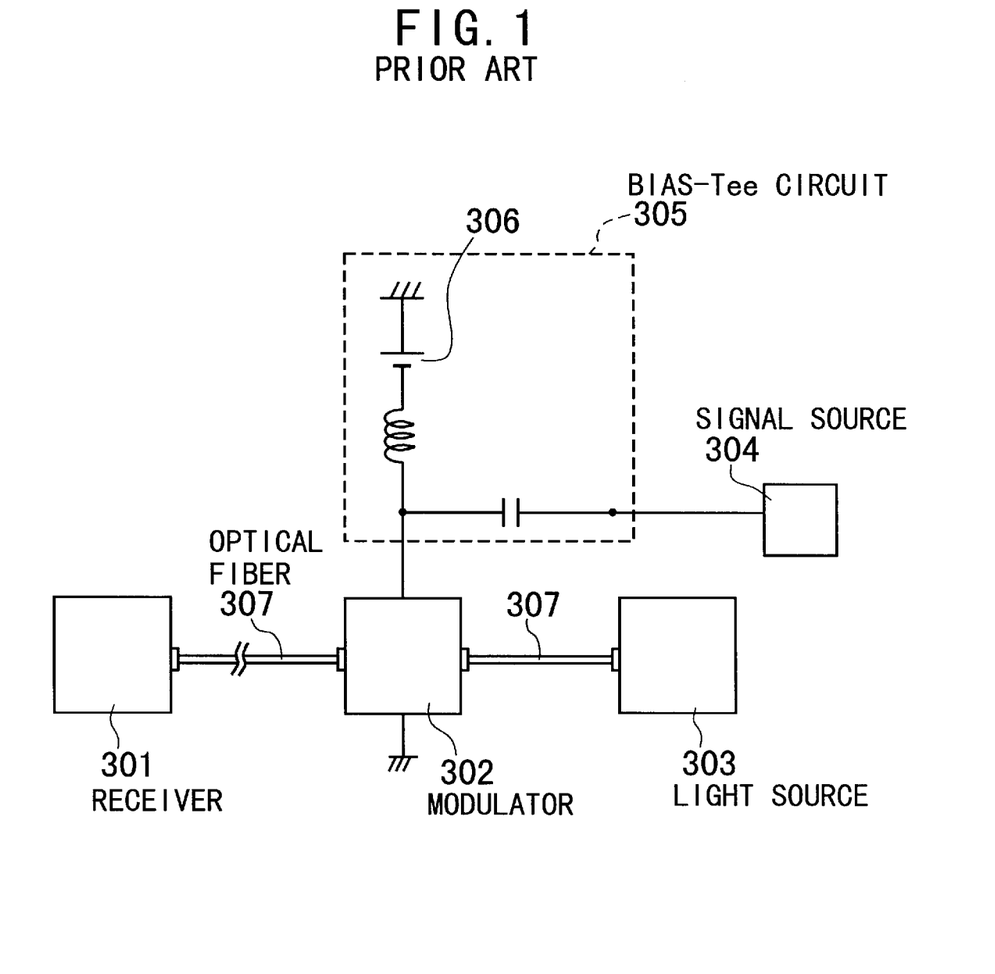
FIG. 1 is a schematic diagram showing the configuration of a conventional semiconductor optical modulator using the prebias method.

With the above-described "prebias" method, such a configuration as shown in FIG. 1 is used. In FIG. 1, a bias-Tee circuit 305 is provided between a signal source 304 and a semiconductor optical modulator 302. The signal source 304 outputs an electric signal for modulation toward the modulator 302 through the bias-Tee circuit 305. The electric signal from the source 304 is additionally applied to the modulator 302 while an offset bias voltage is applied to the modulator 302 by a voltage source 306 in the circuit 305.

Incident light is emitted from a light source 303 to the modulator 302 through an optical fiber 307. The incident light is modulated by the applied electric signal to be transmitted to a receiver 301 located far away from the signal source 304 through an optical fiber 307.

With the configuration shown in FIG. 1, if the offset or bias voltage from the voltage source 306 is increased, the refractive index change of a semiconductor optical absorption layer of the modulator 302 on modulation is turned to be negative; i.e., the refractive index of the absorption layer decreases.

At this time, the change of the refractive index of the absorption layer will increase at the same offset/bias voltage, even if a detune, which is defined as the difference between the wavelength of the incident light and the absorption-edge (or, bandgap) wavelength of the absorption layer, is decreased.

However, the details about the behavior of the refractive index change with respect to the detune and the offset/bias have not been understood. Also, the optimum values of the detune and the offset/bias for suppressing the chirping phenomenon have not been understood. Accordingly, the practical stability of the conventional prebias method against the fluctuation in detune and/or prebias has not yet been made clear.

To solve this problem, it is necessary to clarify the mechanism of suppressing the chirping phenomenon and the stable chirp parameter against the detune fluctuation.

SUMMARY OF THE INVENTION

Accordingly, an object of the present invention is to provide a semiconductor optical modulator capable of stable modulation operation against the detune fluctuation.

Another object of the present invention is to provide a semiconductor optical modulator capable of highly reliable modulation operation.

Still another object of the present invention is to provide an optical communication module that is able to readily transmit a high-speed optical signal.

A further object of the present invention is to provide an optical communication system capable of no-relay optical transmission to a location 100-km far from the system or longer.

The above objects together with others not specifically mentioned will become clear to those skilled in the art from the following description.

According to a first aspect of the present invention, a semiconductor optical modulator is provided.

This modulator is comprised of a semiconductor optical absorption layer formed on or over a semiconductor substrate, and a pair of electrodes arranged at each side of the absorption layer for applying an electric field to the absorption layer.

A detune is determined in such a way that a changing rate in refractive-index of the absorption layer generated on application of a fixed biasing electric-field to the absorption layer increases from its initial value at the time no biasing electric-field is applied.

When a signal electric-field is additionally applied to the absorption layer by introducing an incident light into the absorption layer while applying the biasing electric-field, (a) the changing rate in refractive-index of the absorption layer is decreased or substantially unchanged due to the applied signal electric-field with respect to a value under application of the biasing electric-field, and at the same time, (b) the absorption coefficient of the absorption layer is increased from its initial value at the time the signal electric-field is not applied and the biasing electric-field is applied.

With the semiconductor optical modulator according to the first aspect of the present invention, a detune is determined in such a way that a changing rate in refractive-index of the absorption layer generated on application of a fixed biasing electric-field to the absorption layer increases from its first initial value at the time no biasing electric-field is applied.

Further, when a signal electric-field is additionally applied to the absorption layer by introducing an incident light into the absorption layer while applying the biasing electric-field, (a) the changing rate in refractive-index of the absorption layer is decreased or substantially unchanged due to the applied signal electric-field with respect to a second initial value under application of the biasing electric-field, and at the same time, (b) the absorption coefficient of the absorption layer is increased from its initial value at the time the signal electric-field is not applied and the biasing electric-field is applied.

Therefore, the chirp parameter can be set negative, which means that the preferable negative chirping occurs on modulation due to the application of the signal electric-field.

As a result, a stable modulation operation can be realized against the detune fluctuation. This leads to extend the possible transmission distance.

In a preferred embodiment of the present invention, a chirp parameter $\alpha_p$ is defined as $$\alpha_p = \left(\frac{4\pi}{\lambda}\right)\left(\frac{\Delta n}{\Delta \alpha}\right),$$

where $\lambda$ is the wavelength of the incident light, $\Delta n$ is the change in refractive index of the absorption layer due to the application of the signal electric-field, and $\Delta \alpha$ is the change in absorption coefficient of the absorption layer due to the application of the signal electric-field.

The detune is set in such a way that the change $\delta\alpha_p$ in chirp parameter $\alpha_p$ with respect to the change $\delta\alpha_p$ in detune satisfies the following relationship as $$\frac{\delta\alpha_p}{\delta\lambda} \leq 0.1.$$

In this case, because the lower limit of the detune is set, the fluctuation in chirp parameter is surely suppressed even for the case where the detune is small. Accordingly, a more stable modulation operation can be realized against the detune fluctuation. In other words, there is an additional advantage that the chirp parameter $\alpha_p$ has a sufficiently small change even if the detune fluctuates due to the tolerance in the fabrication processes.

In another preferred embodiment of the present invention, the optical absorption layer has a multiple quantum-well structure.

According to a second aspect of the present invention, an optical communication module is provided.

This module is comprised of the semiconductor optical modulator according to the first embodiment, an optical condenser for condensing an incident light beam to the modulator, and an optical coupler for coupling an output light beam from the module with an optical fiber.

With the optical communication module according to the second aspect of the present invention, because the semiconductor optical modulator according to the first embodiment is included, a high-speed optical signal can be readily transmitted.

According to a third aspect of the present invention, an optical communication system is provided.

This system is comprised of a transmitter for transmitting an optical signal, an optical waveguide for guiding the optical signal from the transmitter to the outside, a receiver for receiving the optical signal transmitted through the waveguide. The transmitter includes the semiconductor optical modulator according to the first embodiment.

With the optical communication system according to the third aspect of the present invention, because the transmitter includes the semiconductor optical modulator according to the first embodiment, no-relay optical transmission at a transmission distance of 100 km or longer can be realized.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Preferred embodiments of the present invention will be described below referring to the drawings attached.

FIRST EMBODIMENT

Figure 2:
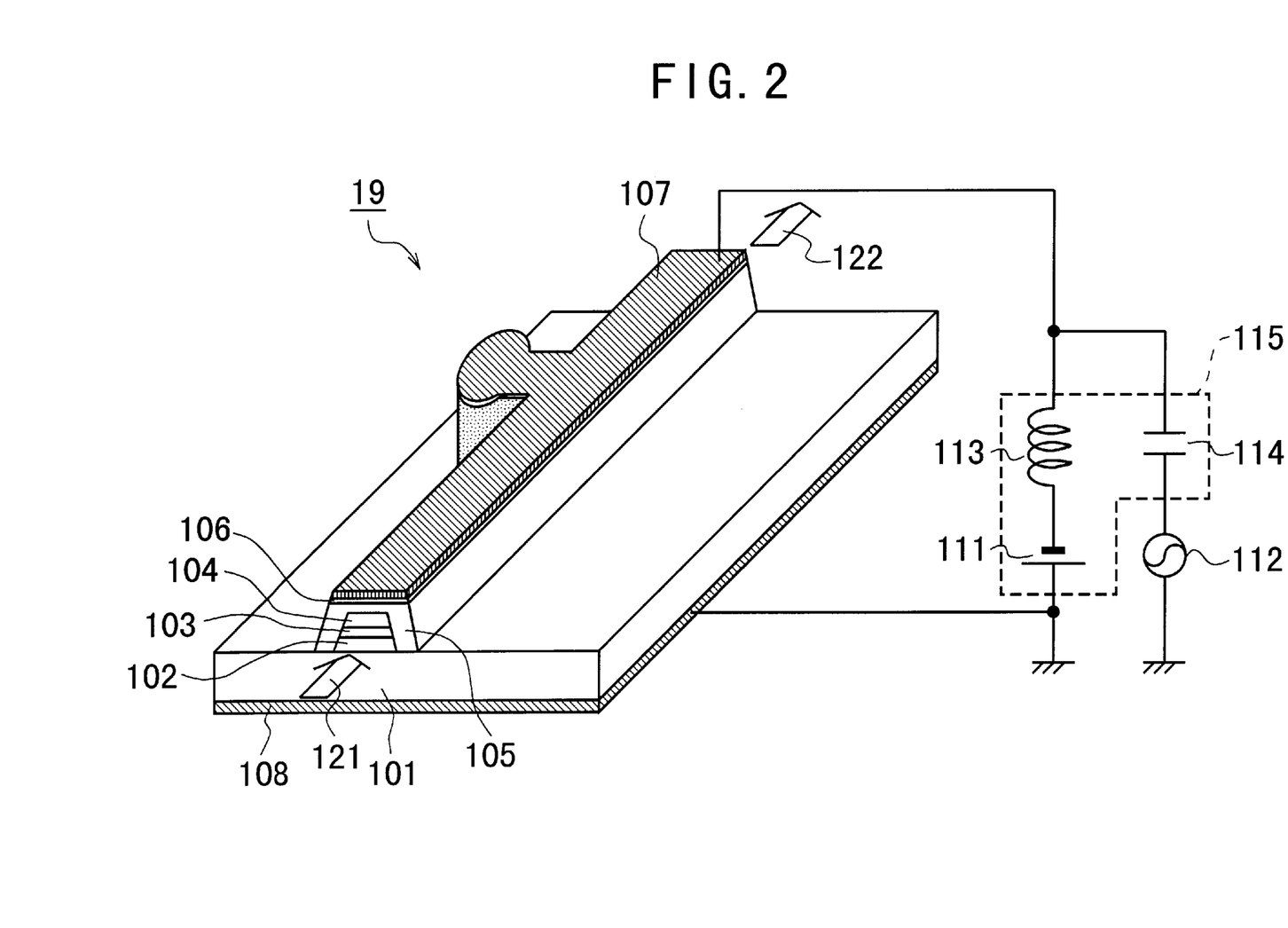
FIG. 2 is a perspective view of a semiconductor optical modulator according to a first embodiment of the present invention.

As shown in FIG. 2, an InP-system MQW electroabsroption optical modulator 19 according to a first embodiment of the present invention includes an n-type, (100)-oriented InP substrate 101 with a rectangular shape. A slab structure is formed on an upper main surface of the substrate 101 to extend along the longitudinal axis of the substrate 101.

The slab structure has an n-type InP buffer layer (career concentration: $5\times10^{17}$ atoms/cm$^3$) 102 formed on the upper main surface of the substrate 101, an InGaAsP/InGaAsP MQW optical absorption layer 103 formed on the n-type buffer layer 102, and a p-type InP cladding layer 104 (career concentration: $2\times10^{17}$ atoms/cm$^3$) formed on the optical absorption layer 103.

The MQW optical absorption layer 103 is formed by 0.45%-compressively-strained well sublayers with a thickness of 5.8 nm and unstrained barrier sublayers with a thickness of 6 nm, which are alternately stacked. The absorption layer 103 has an absorption-edge or bandgap wavelength $λ_g$ of 1.485 μm. For incident light with a wavelength $λ_{op}$ of 1.55 μm, the layer 103 has a detune Δλ of 65 nm, because $Δλ=λ_{op}-λ_g$=0.065 μm.

A p$^+$-type InP cladding layer (career concentration: $5\times10^{17}$ atoms/cm$^3$) 105 is formed to cover the slab structure. The p$^+$-type cladding layer 105 is contacted with the top and each lengthwise side of the slab structure and the exposed, upper main surface of the substrate 101. Each widthwise side of the slab structure is exposed from the p$^+$-type cladding layer 105 and serving as an entrance and an outlet of the incident light, respectively. Thus, a buried optical waveguide is formed on the substrate 101 to extend along the longitudinal axis of the substrate 101.

A p$^+$-type InGaAs cap layer (carrier concentration: $1\times10^{19}$ atoms/cm$^3$) 106 is formed on the p$^+$-type cladding layer 105. A Ti/Au p-side pad electrode 107 is formed on the p$^+$-type cap layer 106. The cap layer 106 and the p-side electrode 107 are located on the top of the slab structure.

A Ti/Au n-side electrode 108 is formed on a lower main surface of the substrate 101 to cover the whole lower main surface.

Although not shown, a polyimide layer is buried below the p-side electrode 107 to decrease the parasitic capacitance, thereby enabling the high-speed operation. To prevent the optical reflection, the two widthwise sides of the slab structure are coated by anti-coating layers (not shown), respectively.

Next, the operation of the InP-system electroabsroption optical modulator according to the first embodiment is explained below.

The basic operation of this modulator 19 according to the first embodiment is the same as that of the conventional modulator shown in FIG. 1.

Specifically, a bias-Tee circuit 115 is provided between a signal source 112 and the semiconductor optical modulator 19. The signal source 112 outputs an electric signal for modulation toward the modulator 19 through the bias-Tee circuit 115. An offset or bias voltage is applied across the p- and n-side electrodes 107 and 108 of the modulator 19 by a voltage source 111 in the circuit 115. The electric signal to be transmitted, which is outputted from the signal source 112, is additionally applied across the p- and n-side electrodes 107 and 108 of the modulator 19 under application of the offset bias voltage.

In the bias-Tee circuit 115, an inductor 113 serves as a high-pass filter and a capacitor 114 serves as a low-pass filter.

On the other hand, the incident light, which is emitted from a light source (not shown), is introduced into the waveguide of the modulator 19 along an arrow 121 through an optical fiber or fibers (not shown). The incident light thus introduced is then modulated by the applied electric signal from the signal source 112 and is emitted along an arrow 122, thereby entering an optical fiber or fibers (not shown). The emitted, modulated incident light is transmitted to a receiver (not shown) located far away from the signal source 112 and the modulator 19 through the fiber or fibers.

Figure 3:
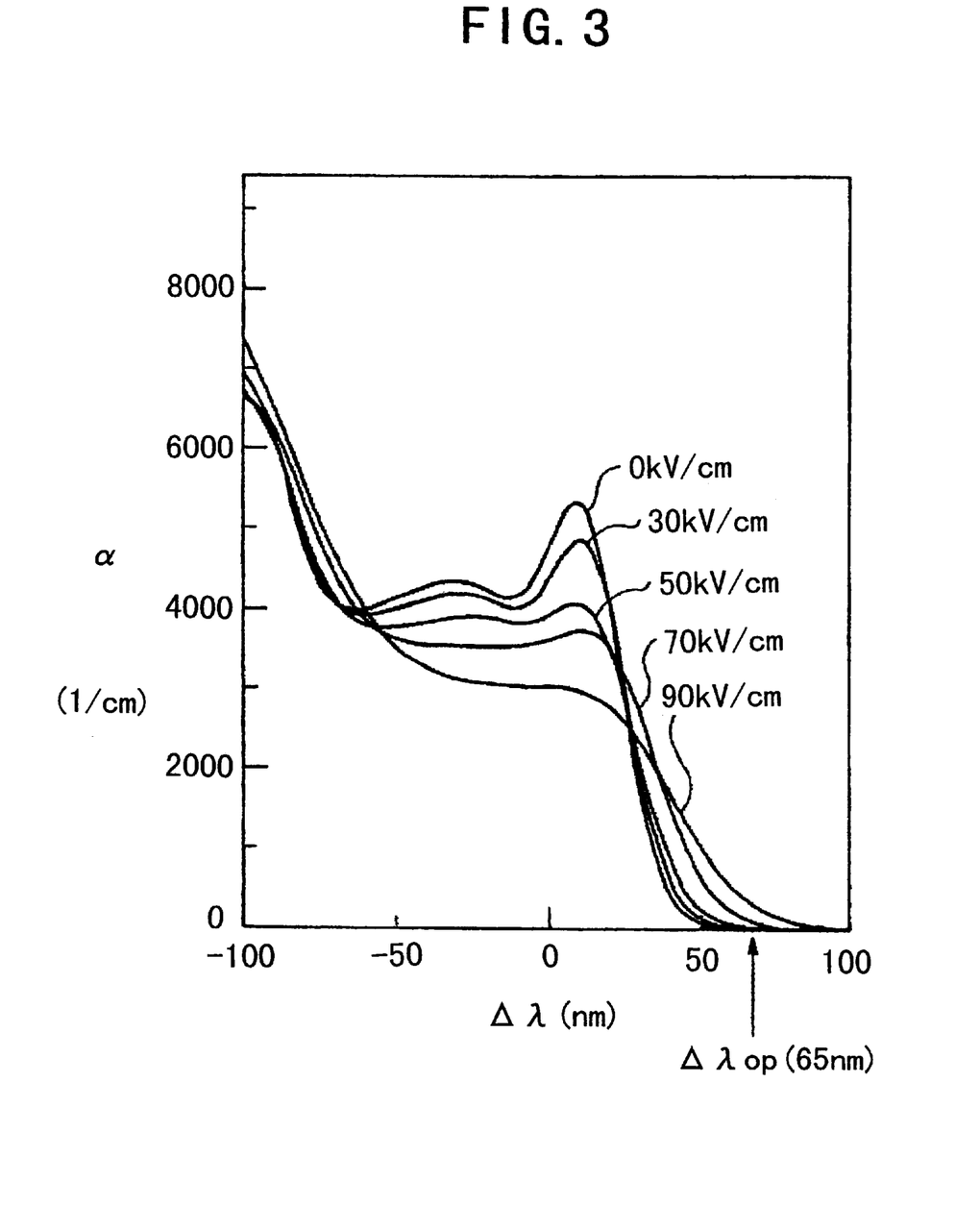
FIG. 3 is a graph showing the relationship between the optical absorption coefficient α of the absorption layer and the detune Δλ in the semiconductor optical modulator according to the first embodiment in FIG. 2.

FIG. 3 shows the detune dependence of the optical absorption coefficient $\alpha$ of the optical absorption layer 103 as a parameter of the applied biasing electric-field, where the operating detune $\Delta\lambda_{op}$ is 65 nm.

It is seen from FIG. 3 that the absorption coefficient $\alpha$ is very small in the region where the detune $\Delta\lambda$ is equal to 50 nm or greater and that the absorption coefficient $\alpha$ increases with the increasing biasing electric-field in the same region. This means that the incident light will be extinguished in the modulator 19 and no output light will be emitted therefrom (i.e., the optical output signal is OFF) by the applied bias voltage.

Figure 4:
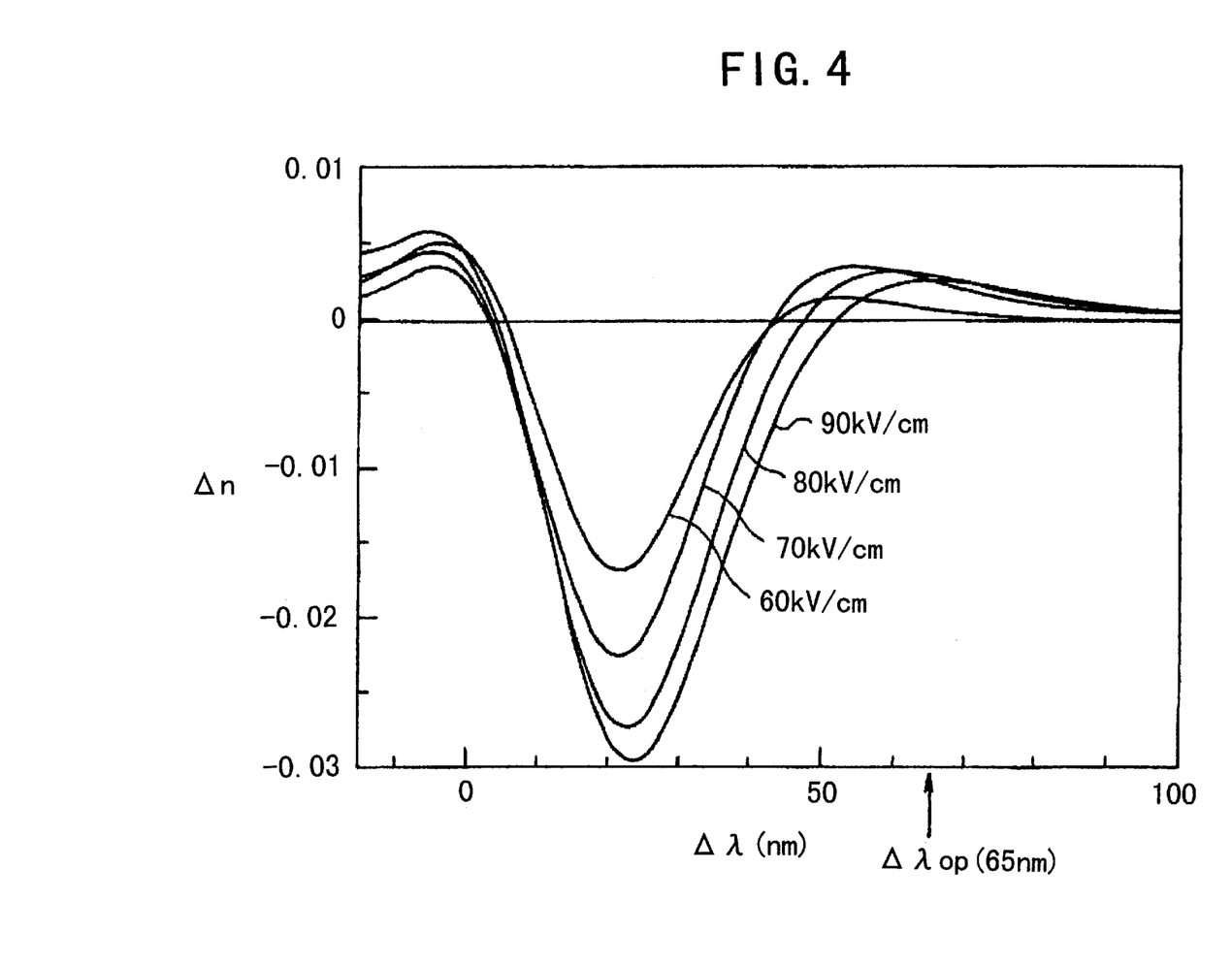
FIG. 4 is a graph showing the relationship between the refractive index change Δn of the absorption layer and the detune Δλ in the semiconductor optical modulator according to the first embodiment in FIG. 2.
Figure 5:
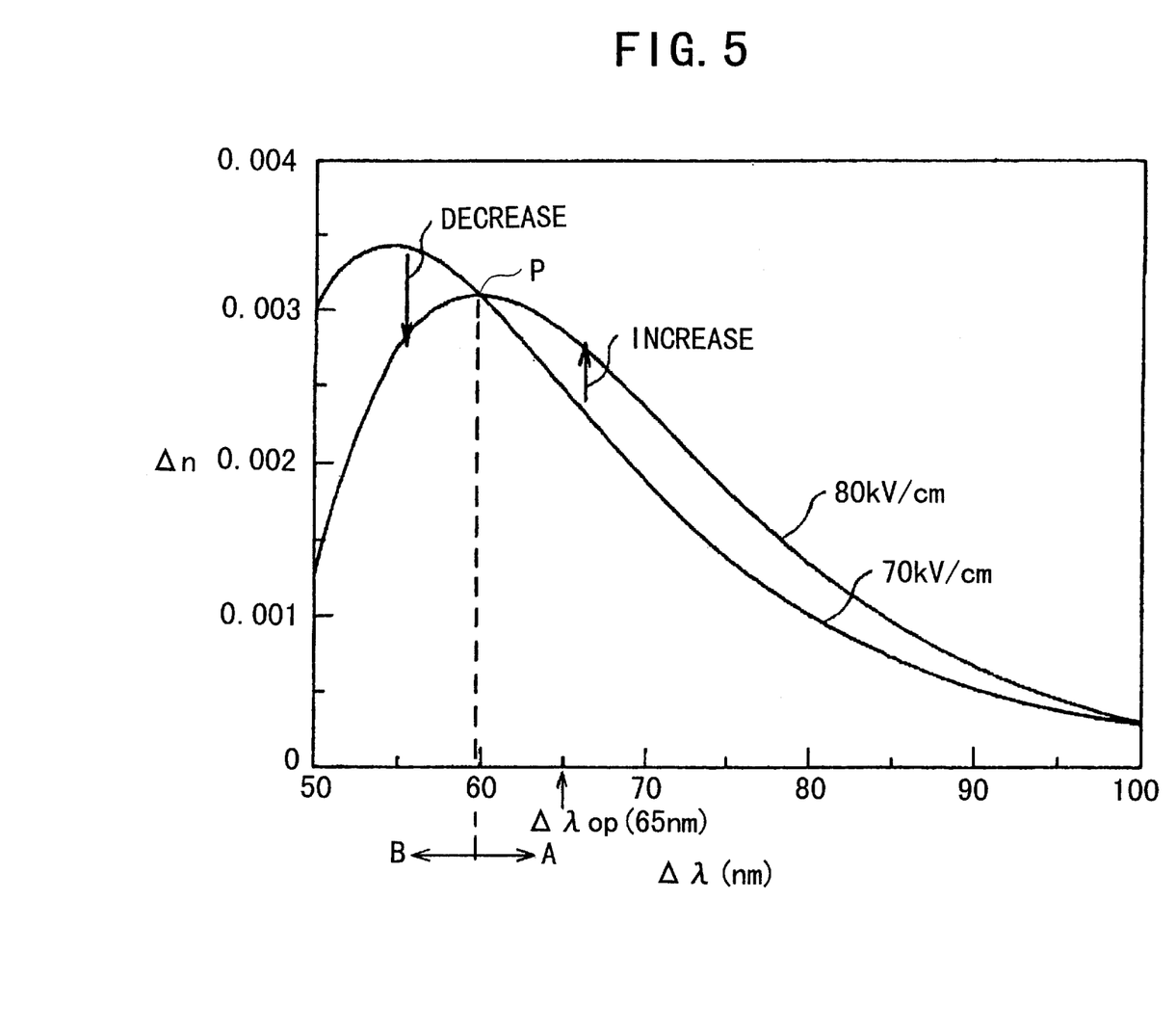
FIG. 5 is an enlarged graph showing the relationship between the refractive index change Δn of the absorption layer and the detune Δλ in the semiconductor optical modulator according to the first embodiment in FIG. 2.

FIG. 4 shows the detune dependence of the refractive-index change $\Delta n$ of the absorption layer 103 as a parameter of the applied biasing electric-field, where the operating dune $\Delta\lambda_{op}$ is 65 nm. FIG. 5 shows an enlarged one of the graph in FIG. 4 in the vicinity of the point where the detune $\Delta\lambda$ is 60 nm.

It is seen from FIG. 5 that when the signal electric-field of 10 kV/cm is also applied to the modulator 19 while the biasing electric-field of 70 kV/cm is applied thereto, there are a region A where the refractive-index change $\Delta n$ of the absorption layer 103 is increased and a region B where the refractive-index change $\Delta n$ is decreased. No change in $\Delta n$ occurs at the point P where two curves for 70 kV/cm and 80 kV/cm are intersected.

In the modulator 19 according to the first embodiment, $\Delta\lambda = \Delta\lambda_{op} = 65$ nm. Therefore, the point of $\Delta\lambda_{op}$ is included in the region A.

Figure 6:
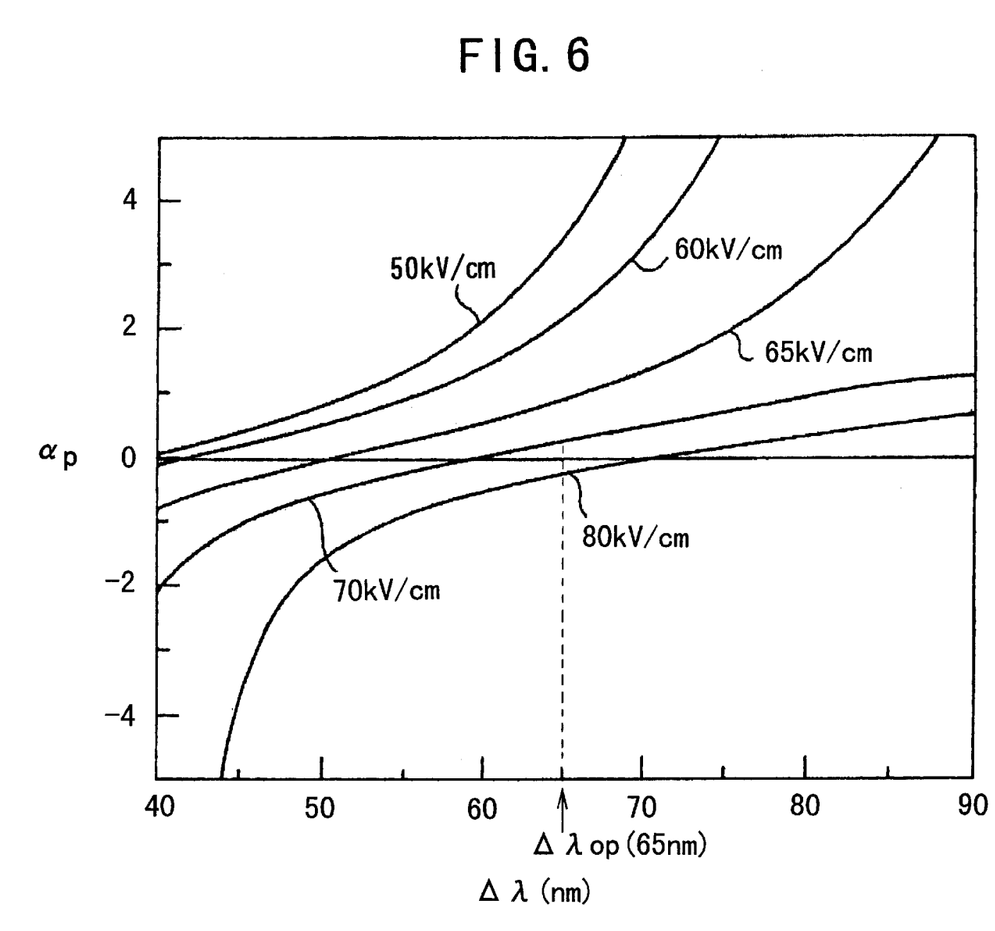
FIG. 6 is a graph showing the relationship between the chirp parameter $α_p$ and the detune Δλ in the semiconductor optical modulator according to the first embodiment in FIG. 2.

FIG. 6 shows the detune dependence of the chirp parameter $\alpha_p$, which is defined as $$\alpha_p = \left(\frac{4\pi}{\lambda_{op}}\right)\left(\frac{\Delta n}{\Delta \alpha}\right), \quad (1)$$

as a parameter of the applied electric-field.

It is seen from FIG. 6 that the chirp parameter $\alpha_p$ has a negative value in the region where the signal electric-field is 70 kV/cm to 80 kV/cm.

Further, it is seen from FIG. 6 that the chirp parameter $\alpha_p$ has a very small change in the vicinity of the point where $\Delta\lambda_{op}$ is 65 nm. For example, even if the detune $\Delta\lambda$ fluctuates in the range of approximately 10 nm, the chirp parameter $\alpha_p$ will change in the range of only approximately 0.5.

Due to generalization of this result, it can be said that the biasing voltage or electric-field and the detune $\Delta\lambda$ should be designed in such a way that the ratio of the fluctuation $\delta\alpha$ of the chirp parameter $\alpha_p$ with respect to the fluctuation $\delta\lambda$ of the detune $\Delta\lambda$ satisfies the following relationship (1).

$$\frac{\delta\alpha_p}{\delta\lambda} \leq 0.1 \quad (2)$$

In other words, the biasing voltage or electric-field and the detune $\Delta\lambda$ should be designed so that the gradient of the curve in FIG. 6 is 0.1 or less.

When the relationship (2) is satisfied, the modulation operation of the modulator 19 according to the first embodiment is capable of a stable modulation operation against the fluctuation of the detune $\Delta\lambda$, which will be generated by the tolerance in fabrication processes or by the wavelength deviation in incident light. This leads to highly reliable modulation operation.

Figure 7:
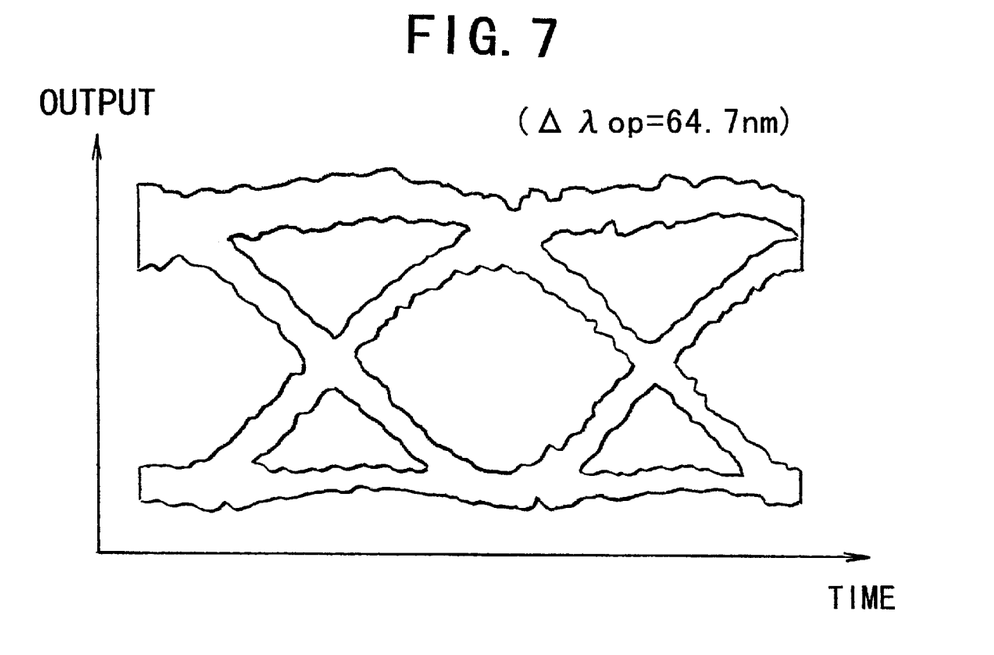
FIG. 7 is a schematic view showing the waveform of the incident light transmitted by the semiconductor optical modulator according to the first embodiment in FIG. 2, in which the light was modulated at a speed of 10 Gb/s and received by an optical receiver located far from this modulator by 40 km, and $Δλ_{op}$=64.7 nm.
Figure 8:
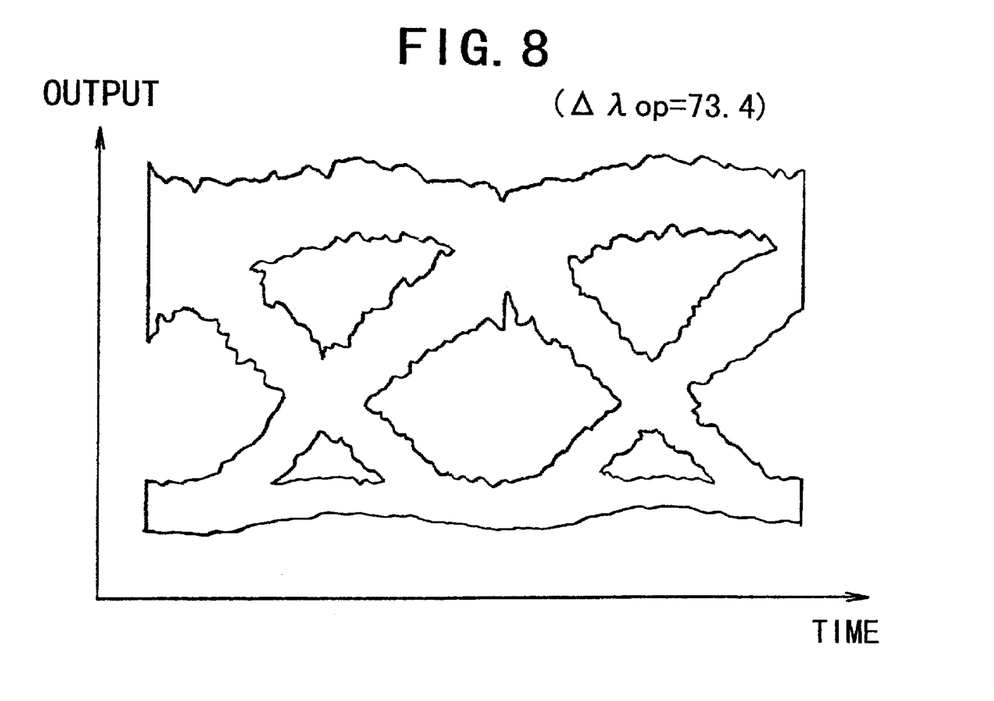
FIG. 8 is a schematic view showing the waveform of an incident light transmitted by the semiconductor optical modulator according to the first embodiment in FIG. 2, in which the light was modulated at a speed of 10 Gb/s and received by an optical receiver located far from this modulator by 40 km, and $Δλ_{op}$=73.4 nm.

FIGS. 7 and 8 show the waveform of the incident light transmitted by the optical modulator according to the first embodiment in FIG. 2. These results were obtained by the inventor's tests under the condition that the wavelength $\lambda_{op}$ of the incident light was 1.55 $\mu$m, the modulation rate was 10 Gb/s, the applied prebias electric-field was 80 kV/cm, and the transmission distance was 40 km. FIG. 7 corresponds to the case where $\Delta\lambda_{op}=64.7$ nm and FIG. 8 corresponds to the case where $\Delta\lambda_{op}=73.4$ nm, in which the difference in $\Delta\lambda_{op}$ is 8.7 nm.

It is seen from FIGS. 7 and 8 that even if the detune $\Delta\lambda_{op}$ fluctuates by approximately 10 nm, the waveform of the received light can be approximately the same as that of the incident light. This means that the modulator 19 according to the first embodiment in FIG. 2 is stable against the comparatively large detune fluctuation.

It is needless to say that the present invention is not limited to the first embodiment. The invention may be applied to semiconductor optical modulators including any one of InP-system InGaAsP/InP MQW optical absorption layers or bulk semiconductor optical absorption layers. It is not necessary that the waveguide has a slab structure, and any other configuration may be used. The other conditions such as the material, thickness, and composition of the semiconductor substrate and semiconductor layers may be changed to any other ones.

SECOND EMBODIMENT

Figure 9:
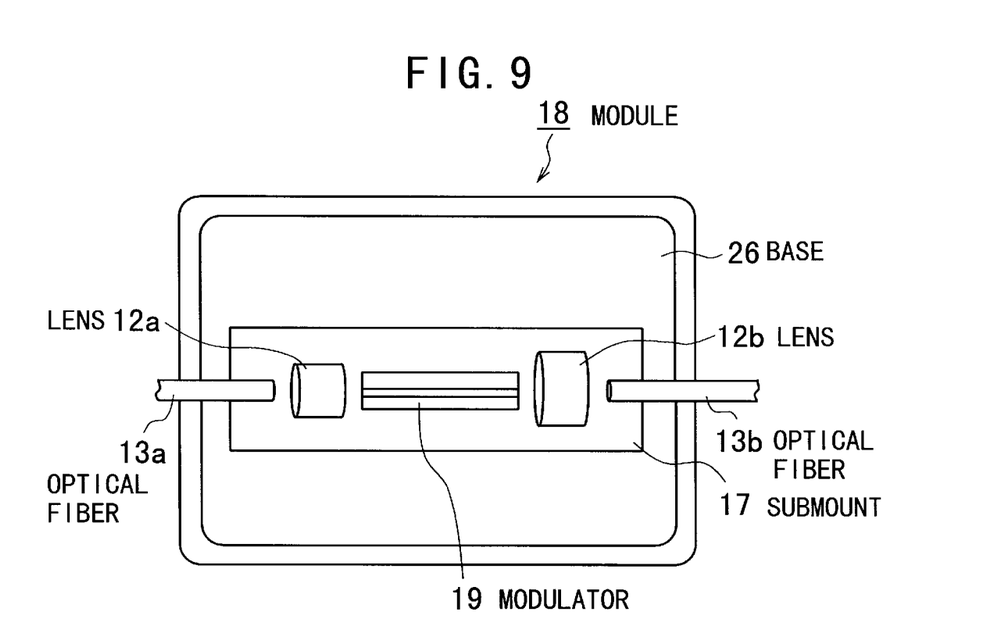
FIG. 9 is a plan view of an optical communication module according to a second embodiment of the present invention, which includes the semiconductor optical modulator according to the first embodiment of FIG. 2.

FIG. 9 shows an optical communication module 18 according to a second embodiment of the present invention. This module 18 includes the semiconductor optical modulator according to the first embodiment in FIG. 2.

As seen from FIG. 9, the module 18 has a rectangular base 26, and a rectangular submount 17 fixed onto the base 26. The modulator 19 according to the first embodiment is fixed on the submount 17 at its center to be parallel to the longitudinal axis of the submount 17.

A pair of aspherical lenses 12a and 12b are fixed onto the submount 17 at each side of the modulator 19. The pair of lenses 12a and 12b are located on the optical axis of the optical modulator 19.

On use, a pair of optical fibers 13a and 13b are attached onto the submount 17 at each side of the modulator 19, as shown in FIG. 9. Corresponding ends of the pair of fibers 13a and 13b are located near the pair of lenses 12a and 12b, respectively. The ends of the pair of fibers 13a and 13b are located on the optical axis of the optical modulator 19.

A casing (not shown) is attached to the base 26 to cover the submount 17, the modulator 19, the pair of lenses 12a and 12b, and the ends of the pair of fibers 13a and 13b for the purpose of encapsulation.

With the optical communication module 18 according to the second embodiment, since the semiconductor optical modulator according to the first embodiment in FIG. 2 is included, a high-speed optical signal can be readily transmitted.

THIRD EMBODIMENT

Figure 10:
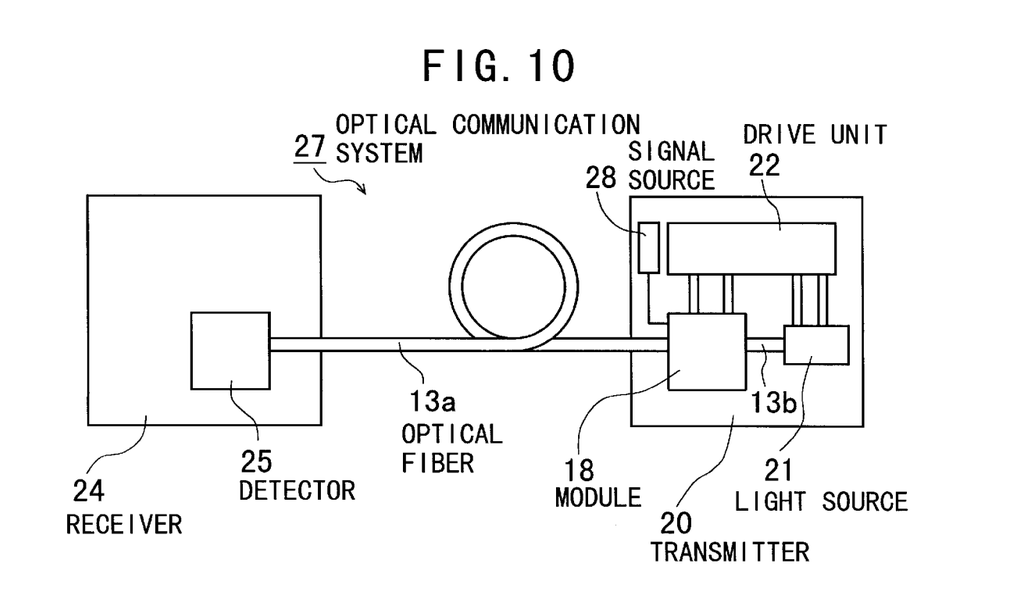
FIG. 10 is a plan view of an optical communication system according to a third embodiment of the present invention, which includes the optical communication module according to the second embodiment of FIG. 9.

FIG. 10 shows an optical communication system 27 according to a third embodiment of the present invention. This system 27 includes the optical communication module 18 according to the second embodiment in FIG. 9.

As seen from FIG. 10, the system 27 has a transmitter 20 and a receiver 24. The transmitter 20 and the receiver 24 are interconnected by the optical fiber 13a.

In the transmitter 20, there are the optical communication module 18, a light source 21 for outputting an incident light, a drive unit 22 for driving or controlling the module 18 and the light source 21, and a signal source 28 for outputting an electric signal to be transmitted. The light source 21 is connected to the module 18 by the optical fiber 13b. The signal source 28 may have the same configuration as that in FIG. 2.

In the receiver 24, an optical detector 25 is provided for detecting the transmitted light. The detector 25 is connected to the module 18 by the fiber 13a.

With the optical communication system 27 according to the third embodiment, the incident light emitted from the light source 21 is transmitted to the optical communication module 18 through the fiber 13b. On the other hand, the electric signal to be transmitted is inputted into the module 18. The incident light is modulated by the modulator 19 in the module 18 according to the electric signal. Thus, the electric signal is converted to the optical signal to be outputted from the transmitter 20.

The modulated optical signal thus outputted travels through the fiber 13a to the detector 25 in the receiver 24. Thus, the transmitted optical signal is detected by the detector 25.

With the optical communication system 27 according to the third embodiment, since the optical communication module 18 according to the second embodiment in FIG. 9 is used, no-relay optical transmission at a transmission distance of 100 km or longer can be readily realized. This is because the degradation in the transmitted optical signal due to the dispersion of the optical fiber 13a is largely reduced by the previously-described reason.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A semiconductor optical modulator comprising:
   a semiconductor substrate;
   a semiconductor optical absorption layer formed on or over said substrate; and
   a pair of electrodes arranged at each side of said absorption layer for applying an electric field to said absorption layer;
   said modulator having a detune wherein a rate of change in refractive-index of said absorption layer, generated on application of a fixed biasing electric-field to said absorption layer, increases from its initial value at the time when no biasing electric-field is applied;
   and wherein when a signal electric-field is also applied to said absorption layer and an incident light is introduced into said absorption layer while applying said biasing electric-field, (a) the rate of change in refractive-index of said absorption layer is decreased or substantially unchanged due to said applied signal electric-field with respect to a value under application of said biasing electric-field, and, at the same time, (b) the absorption coefficient of said absorption layer is increased from its initial value at the time when no signal electric-field is applied and said biasing electric-field is applied.

2. The modulator as claimed in claim 1, wherein a chirp parameter $\alpha_p$ is defined as $$\alpha_p = \left(\frac{4\pi}{\lambda}\right)\left(\frac{\Delta n}{\Delta \alpha}\right),$$

where $\lambda$ is the wavelength of said incident light, $\Delta n$ is the change in refractive index of said absorption layer due to the application of said signal electric-field, and $\Delta a$ is the change in absorption coefficient of said absorption layer due to the application of said signal electric-field;

and wherein said detune is set in such a way that the change $\delta \alpha_p$ in chirp parameter $\alpha_p$ with respect to the change $\delta \alpha_p$ in detune satisfies the following relationship as $$\frac{\delta \alpha_p}{\delta \lambda} \leq 0.1.$$

3. The modulator as claimed in claim 1, wherein said optical absorption layer has a multiple quantum-well structure.

4. An optical communication module comprising:
   (i) a semiconductor optical modulator;
      said modulator including;
      a semiconductor substrate;
      a semiconductor optical absorption layer formed on or over said substrate; and
      a pair of electrodes arranged at each side of said absorption layer for applying an electric field to said absorption layer;
      said modulator having a detune wherein a rate of change in refractive-index of said absorption layer, generated on application of a fixed biasing electric-field to said absorption layer, increases from its initial value at the time when no biasing electric-field is applied;
      and wherein when a signal electric-field is also applied to said absorption layer and an incident light is introduced into said absorption layer while applying said biasing electric-field, (a) the rate of change in refractive-index of said absorption layer is decreased or substantially unchanged due to said applied signal electric-field with respect to a value under application of said biasing electric-field, and, at the same time, (b) the absorption coefficient of said absorption layer is increased from its initial value at the time when no signal electric-field is applied and said biasing electric-field is applied;
   (ii) an optical condenser for condensing an incident light beam to said modulator; and
   (iii) an optical coupler for coupling an output light beam from said module with an optical fiber.

5. An optical communication system comprising:
   (1) a transmitter for transmitting an optical signal, said transmitter including a semiconductor optical modulator;

said modulator including;
a semiconductor substrate;
a semiconductor optical absorption layer formed on or over said substrate; and
a pair of electrodes arranged at each side of said absorption layer for applying an electric field to said absorption layer;
said modulator having a detune wherein a rate of change in refractive-index of said absorption layer, generated on application of a fixed biasing electric-field to said absorption layer, increases from its initial value at the time when no biasing electric-field is applied;
and wherein when a signal electric-field is also applied to said absorption layer and an incident light is introduced into said absorption layer while applying said biasing electric-field, (a) the rate of change in refractive-index of said absorption layer is decreased or substantially unchanged due to said applied signal electric-field with respect to a value under application of said biasing electric-field, and, at the same time, (b) the absorption coefficient of said absorption layer is increased from its initial value at the time when no signal electric-field is applied and said biasing electric-field is applied;

(ii) an optical waveguide for guiding said optical signal from said transmitter to the outside; and (iii) a receiver for receiving said optical signal transmitted through said waveguide.

* * * * *